United States Patent [19]

von Bogdandy et al.

[11] Patent Number: 4,861,369

[45] Date of Patent: Aug. 29, 1989

[54] PROCESS FOR GAINING ELECTRIC ENERGY IN ADDITION TO PRODUCING MOLTEN PIG IRON AND AN ARRANGEMENT FOR CARRYING OUT THE PROCESS

[75] Inventors: Ludwig von Bogdandy; Werner Kepplinger, both of Linz; Kurt Stift, Leoben, all of Austria; Gero Papst, Kaarst; Rolf Hauk, Düsseldorf, both of Fed. Rep. of Germany

[73] Assignee: Korf Engineering GmbH, Fed. Rep. of Germany

[21] Appl. No.: 125,482

[22] Filed: Nov. 25, 1987

[30] Foreign Application Priority Data

Nov. 25, 1986 [AT] Austria .................. 3145/86

[51] Int. Cl.$^4$ .............................. C21B 3/04
[52] U.S. Cl. ................... 75/38; 60/39.12; 75/40; 266/155; 266/160
[58] Field of Search ......... 266/144, 160, 155; 75/34, 35, 38, 59.17; 60/39.02, 39.12

[56] References Cited

U.S. PATENT DOCUMENTS 4,551,172 11/1985 Formanek et al. ............ 75/38
4,676,824 6/1987 Daradimos et al. ........... 266/160

FOREIGN PATENT DOCUMENTS 0139310 5/1985 European Pat. Off. .
150340 8/1985 European Pat. Off. .
0010627 12/1985 European Pat. Off. .
148973 2/1986 European Pat. Off. .
0182775 5/1986 European Pat. Off. .
0192912 9/1986 European Pat. Off. .
3100751 1/1982 Fed. Rep. of Germany .
3345107 9/1984 Fed. Rep. of Germany .
3418488 8/1985 Fed. Rep. of Germany .
2067668 7/1981 United Kingdom .

Primary Examiner—Melvyn J. Andrews
Attorney, Agent, or Firm—Ostrolenk, Faber, Gerb & Soffen

[57] ABSTRACT

To gain electric energy in addition to producing molten pig iron, from lumpy iron ore and solid fuels, by using a direct reduction zone for the reduction of the iron ore to sponge iron and a meltdown-gasifying zone for the production of molten pig iron, carbon carriers are used in, and oxygen-containing gases are supplied to, the meltdown-gasifying zone. The reduction gas forming is fed into the direct reduction zone. The reduction gas reacted there is supplied as top gas to a power generation plant including a turbine. In order to adapt the power generation to the power consumption by simultaneously avoiding any influence on the metallurgical conditions at the production of pig iron and its further processing, the charge of carbon carriers into the meltdown-gasifying zone is varied as a function of the gas consumption of the power generation plant in a manner that, with a higher gas consumption, the volatile constituents of the charge are increased and the $C_{fix}$ charge is reduced and, with a lower gas consumption, it is proceeded the other way round, while keeping the amount and composition of the pig iron produced substantially constant.

12 Claims, 1 Drawing Sheet

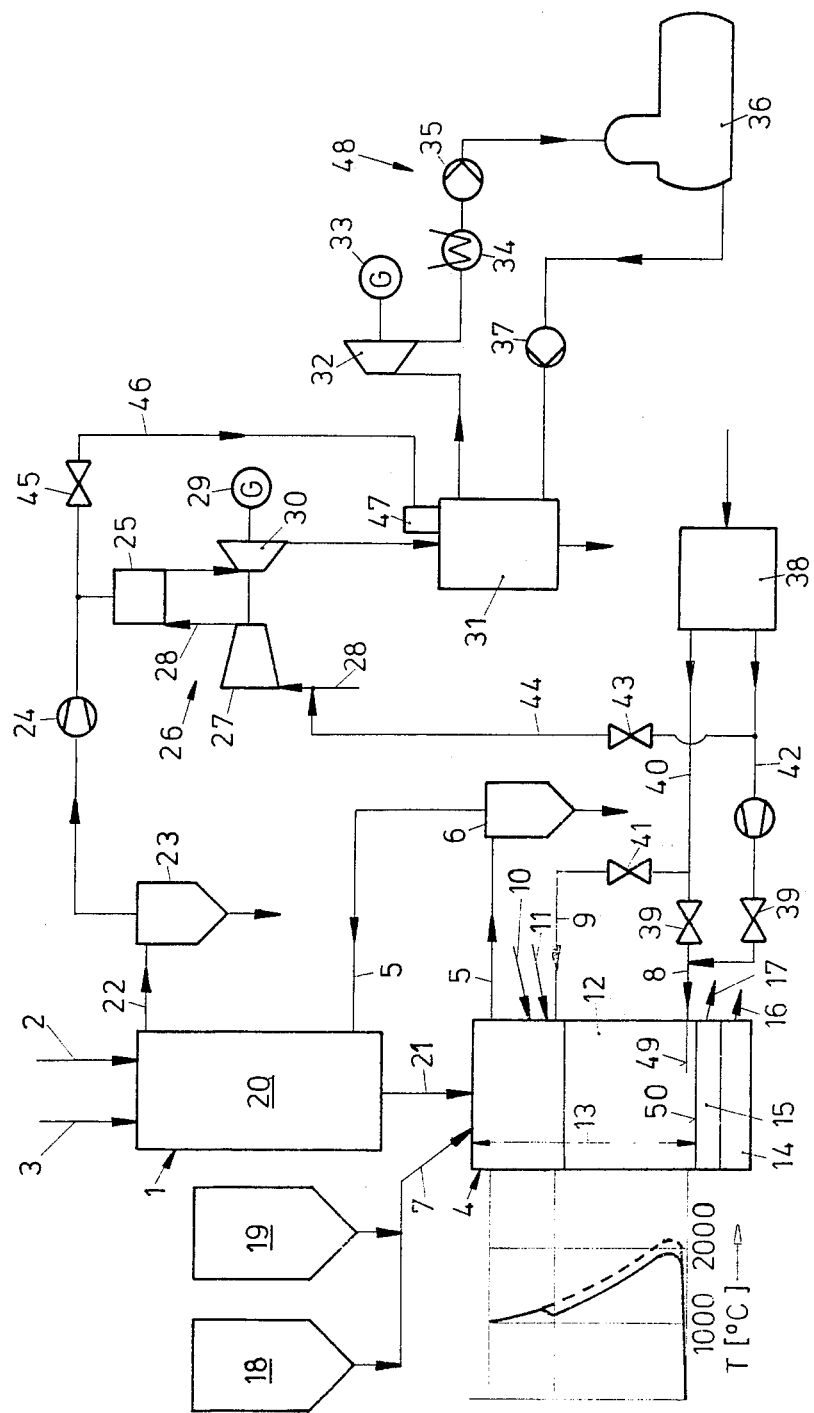

PROCESS FOR GAINING ELECTRIC ENERGY IN ADDITION TO PRODUCING MOLTEN PIG IRON AND AN ARRANGEMENT FOR CARRYING OUT THE PROCESS

The invention relates to a process for gaining electric energy in addition to producing molten pig iron, from lumpy iron ore and solid fuels, by using a direct reduction zone operating at an overpressure for the reduction of the iron ore to sponge iron and a meltdown-gasifying zone for the production of molten pig iron, wherein carbon carriers are used in, and oxygen-containing gases are supplied to, the meltdown-gasifying zone, the reduction gas forming is fed into the direct reduction zone and the reduction gas reacted there is supplied as a top gas to an power generation plant comprising at least one turbine, as well as to an arrangement for carrying out the process.

A process of this type has already been proposed, with a hot gas filter being used to dedust and desulphurate the top gas prior to being converted into current.

There has been the endeavor to adapt the power generation to the current consumption subject to time and seasonal fluctuations. For instance, if the gas production is lowered in order to adapt the amount of top gas to a reduced power demand, this will affect the production of pig iron in that its amount and chemical composition deviates from the amount of pig iron and its chemical composition incurring at the non-reduced top gas production. Yet, such deviations cannot be tolerated in the steelworks operation; in steelworks, a pig iron is sought that lies within as narrow limits as possible in terms of chemical composition and which is to incur in as constant an amount per time unit as possible.

The invention has as its object to improve a process of the initially described kind with a view to enabling the variation of the amount of top gas produced as a function of the gas consumption by the power generation plant without adversely affecting the metallurgical conditions at the production of pig iron and its further processing.

This object is achieved according to the invention in that the charge of carbon carriers into the meltdown-gasifying zone is varied as a function of the gas consumption of the power generation plant in a manner that, with a higher gas consumption, the volatile constituents of the charge are increased and the $C_{fix}$ charge is reduced and, with a lower gas consumption, it is proceeded the other way round, while the amount and composition of the pig iron produced are kept substantially constant.

Carbon carriers with a high portion of volatile constituents yield more and superior quality top gas, since a larger amount of reduction gas is formed in the meltdown-gasifying zone and, due to the constant reduction work to be performed in the direct reduction zone, less is consumed than with the slighter amount of reduction gas forming at the use of carbon carriers with a high $C_{fix}$ portion.

By the $C_{fix}$ portion of carbon carriers, which is also called fixed carbon portion, the yield of crucible coke diminished by the ash content, that forms at the determination of the volatile constituents when heating the carbon carriers is understood (cf. Ullmann, Encyklopä die der technischen Chemie, 4th Ed., Vol. 14, p. 310).

Preferably, three different charge sources are used to provide for a charge of carbon carriers of varying composition, i.e., a coal charge with a high $C_{fix}$ portion, a coal charge with a low $C_{fix}$ portion and a charge of liquid or gaseous hydrocarbons.

The adjustment of the desired ratio of $C_{fix}$ to volatile constituents is effected by mixing the different coals and by introducing into the meltdown-gasifying zone more or less hydrocarbon in gaseous or liquid form at room temperature. In doing so, the basicity of the ash in the meltdown-gasifying zone may be adjusted such that the amount of fluxes may be kept constant by mixing coal with acid ash and coal with basic ash. By mixing the two different coals, the amount of top gas can be changed within a short time, about within half an hour. If a higher amount of top gas is required within a short period of time, hydrocarbons in liquid or gaseous form temporarily will be supplied to the meltdown-gasifying zone in addition to the solid carbon carriers by simultaneously increasing as required the oxygen available for the partial combustion of these hydrocarbons.

According to a preferred variant, the top gas from the direct reduction zone, at a lower gas consumption of the power generation plant, is fed to a combustion chamber of a first power generation stage including a gas turbine unit, the gas released in that gas turbine is supplied to a heat exchanger for the production of steam, and the steam produced is worked off in a second power generation stage including at least one steam turbine and, with a higher gas consumption of the power generation plant, only a portion of the top gas is fed to the combustion chamber of the first power generation stage and a further portion of the top gas is fed to a combustion chamber of the heat exchanger of the second power generation stage to heat the same.

Preferably, the combustion of the top gas in the combustion chamber of the first power generation stage is performed at a temperature of below 1,000° C. by feeding nitrogen or an oxygen-poor nitrogen-oxygen mixture into the combustion chamber or into the combustion air supplied to the gas turbine.

From DE-A No. 31 00 751, EP-A No. 2-0 148 973 and EP-A No. 2-0 150 340, it is known per se for gas/steam turbine power station units arranged to follow coal gasification plants, to keep the combustion temperature low by replacing part of the combustion air required with an oxygen-poor air mixture, yet it has been proceeded independently of a pig iron production.

It is advantageous if sulfur-binding fluxes, in particular $CaCO_3$, $MgCO_3$, $FeCO_3$, are added to the direct reduction zone.

If introduced in an unburnt state, the fluxes are being burnt by the hot reduction gas conducted through the direct reduction zone, absorbing the sulfur contained in the reduction gas. Consequently, they function as a transporting means for the sulfur from the direct reduction zone into the meltdown-gasifying zone and, in the meltdown-gasifying zone, contribute to the formation of a slag in which the sulfur has been bound in a deposable form. The addition of sulfur-binding fluxes to the direct reduction zone reduces the tendency of the hot sponge iron to agglomerate, thus enabling the direct reduction zone to be operated without disturbances even at higher temperatures. The top gas fed to the power generation plant is poor in sulfur.

Preferably, with a low gas consumption of the power generation plant and the use of a coal having a high $C_{fix}$ content, nitrogen or an oxygen-poor nitrogen-oxygen mixture is blown in at a bottom blow-in level of the meltdown-gasifying zone, thus making it possible to influence the chemical composition of the molten pig iron in order to keep the same as constant as possible. In particular, the undesired binding of energy can be inhibited, e.g., by the increased reduction of silicon by lowering the temperature level in the meltdown-gasifying zone, thus keeping the silicon content in the pig iron constant. A decrease in the temperature level will occur if the heat is transported away into higher zones of the meltdown-gasifying zone by the nitrogen-diluted gas.

An arrangement for carrying out the process according to the invention comprising a direct reduction shaft furnace including a supply for lumpy iron ore, a supply for reduction gas as well as one discharge each for the reduction product formed therein and for top gas, a meltdown gasifier into which a duct feeding the reduction product from the shaft furnace enters and which includes supplies for oxygen-containing gases and carbon carriers as well as a duct for reduction gas formed, which enters into the shaft furnace, as well as tap holes for pig iron and slag, and a combined gas and steam turbine power generation plant, with the top gas being fed into a combustion chamber of the gas turbine unit and the gas turbine flue gas being fed to a heat exchanger of the steam turbine unit, is characterized in that the supply for carbon carriers is fed from at least two coal reservoirs, at least one coal reservoir being filled with coal having a high $C_{fix}$ portion and at least a further coal reservoir being filled with coal having a low $C_{fix}$ portion, and from the discharge conducting the top gas out of the shaft furnace and to the combustion chamber of the gas turbine unit, a branch duct provided with a control valve branches off, entering into a combustion chamber of the heat exchanger of the steam turbine unit.

Advantageously, a supply for feeding nitrogen or an oxygen-poor nitrogen-oxygen mixture enters into the meltdown gasifier close to the lower end of the meltdown-gasifying zone.

Suitably, a supply for unburnt fluxes to bind the sulfur enters into the shaft furnace.

In order to raise the amount of top gas for a particularly short period, a supply for carbon carriers liquid or gaseous at room temperature, such as hydrocarbons, advantageously enters into the meltdown gasifier.

The invention will now be explained in more detail by way of a schematically illustrated arrangement for carrying out the process according to the invention.

A direct reduction installation designed as a shaft furnace is denoted by 1, into which lumpy iron ore is charged from top through a supply 2 via a sluice system (not illustrated), together with unburnt fluxes introduced through a supply 3. The direct reduction installation 1 communicates with a meltdown gasifier 4, in which a reduction gas is produced from coal and oxygen-containing gas, which is fed into the shaft furnace 1 through a supply 5, a gas scrubbing and gas cooling means 6 being provided in the supply 5.

The meltdown gasifier 4 comprises a supply 7 for solid lumpy carbon carriers, supplies 8, 9 for oxygen-containing gases, and supplies 10, 11 for carbon carriers liquid or gaseous at room temperature, such as hydrocarbons, as well as for burnt fluxes. In the meltdown gasifier 4, molten pig iron 14 and molten slag 15 collect below the meltdown-gasifying zone 13 and are each tapped separately via a special tap hole 16, 17.

The supply 7 for solid lumpy carbon carriers is fed by at least two coal reservoirs 18, 19 designed as coal bunkers, wherein one coal bunker 18 is filled with coal having a high $C_{fix}$ portion and the other coal bunker 19 is filled with coal having a low $C_{fix}$ portion and a high portion of volatile constituents.

The lumpy ore reduced to sponge iron in a direct reduction zone 20 within the shaft furnace 1, together with the fluxes burnt in the direct reduction zone 20, is fed via a duct 21 connecting the shaft furnace 1 with the meltdown gasifier 4, for instance, by means of a worm discharge not illustrated in detail. To the upper part of the shaft furnace 1, a discharge 22 for the top gas forming in the direct reduction zone 20 is connected.

This top gas, upon passage through a gas scrubbing and gas cooling means 23 provided in the discharge 22, gets to a compressor 24 and subsequently is injected into a first combustion chamber 25 of a gas turbine unit generally denoted by 26. Air compressed by means of a combustion air compressor 27 is additionally supplied into this combustion chamber 25 via an air supply duct 28.

The flue gas leaving the gas turbine 30 actuating a generator 29 is conducted away via a flue gas boiler 31 constituting a heat exchanger, which serves to generate steam. The steam formed in the flue gas boiler 31 is worked off in a steam turbine 32, which serves also to drive a generator 33. In order to form a closed thermodynamic cycle process, the worked off steam is condensed in a consecutively arranged condenser 34, the condensate being supplied, via a condensate pump 35, to a feed-water container 36 including a degasser, from which, in turn, feed water may be taken by means of a feed-water pump 37 and fed to the flue gas reservoir 31.

The oxygen-containing gases injected into the meltdown gasifier 4, depending on the desired composition, are extracted by an air separation plant 38 at the desired mixing ratio, which is adjustable by control valves 39, wherein a branch duct 9 branching off the oxygen supply duct 40 and provided with a control valve 41 enters into the meltdown gasifier 4 above the coke bed 12. From the nitrogen supply duct 42, a branch duct 44, also provided with a control valve 43, branches off, entering into the air supply duct 28 of the combustion air compressor 27 of the gas turbine unit 26.

Between the top gas compressor 24 and the combustion chamber 25 of the gas turbine unit 26, a branch duct 46 provided with a control valve 45 branches off, by which a partial amount of the top gas from a second combustion chamber 47 of the flue gas boiler 31 is feedable to the steam turbine unit 48.

The invention is not limited to the exemplary embodiment illustrated in the drawing, but may be modified in various aspects. For instance, it is possible where gas cooling is provided, to effect this cooling by means of heat exchangers in which steam for the steam turbine unit 48 is generated.

The process according to the invention will be explained in more detail in the following by way of two examples, Example 1 illustrating the process with a high gas consumption of the power generation plant and Example 2 illustrating the process with a low gas consumption of the power generation plant.

EXAMPLE 1

1,550 kg iron ore with 66.5% Fe and 3.2% gangue (acid) as well as 50 kg CaO in the form of unburnt lime are charged, and 300 l $H_2O$ are injected, into the shaft furnace 1 per ton of pig iron produced. The supply of water into the shaft furnace is necessary since otherwise the top gas would incur at too high a temperature, which is unjustifiable to subsequent gas scrubbing.

The meltdown gasifier 4 is charged with 1,500 kg coal per ton of pig iron having a low $C_{fix}$ portion. The $C_{fix}$ portion of the coal is 50%, the portion of volatile constituents is 35%; the balance being ashes. In addition, 710 m³ (normal conditions) of oxygen per ton of pig iron are injected into the meltdown gasifier 4 in a blow-in plane 49 closely above the slag bath level 50 via supply 8.

From the shaft furnace 1 1,100 kg sponge iron and fluxes per ton of pig iron are discharged and charged into the meltdown gasifier 4 via duct 21. Within the meltdown-gasifying zone 13, 750 kg coke/t pig iron form from the coal. The pig iron incurs at a temperature of 1,450° C. and has the following chemical composition:

TABLE I

| |
|---|
| 3.78% C |
| 0.60% Si |
| 0.42% Mn |
| 0.060% P |
| 0.045% S |

Per ton of pig iron, 325 kg slag form from the ashes introduced with the coal, the gangue of the ore and the charged fluxes.

The reduction gas forming in the meltdown gasifier 4 leaves the same at 1,000° C. and, upon scrubbing and cooling, is introduced into the direct reduction zone 20 of the shaft furnace 1 at 850° C. It incurs in an amount of 3,445 m³ (normal conditions)/t pig iron. Its chemical composition is the following:

TABLE II

| |
|---|
| 60.4% CO |
| 3.0% CO$_2$ |
| 31.6% H$_2$ |
| 5.0% N$_2$ + (H$_2$S about 1,300 ppm) |

The top gas emerging from the shaft furnace 1, upon cooling by the water injected, has a temperature of 400° C., incurring in an amount of 3,270 m³ (normal conditions)/t pig iron. Its chemical composition is as follows:

TABLE III

| |
|---|
| 47.6% CO |
| 19.2% CO$_2$ |
| 27.9% H$_2$ |
| 5.3% N$_2$ + (H$_2$S about 80 ppm) |

Its calorific value is 9,023 kJ/m³ (normal conditions).

EXAMPLE 2

1,550 kg iron ore with 66.5% Fe and 3.2% gangue (acid) as well as 100 kg fluxes (CaO in the form of unburnt lime+SiO$_2$) per ton of pig iron produced are charged into the shaft furnace 1. 1,000 kg coal per ton of pig iron, having a high $C_{fix}$ portion, are charged into the meltdown gasifier 4, the $C_{fix}$ portion of the coal being 70%, the portion of volatile constituents being 20% the balance being ashes. In addition, 660 m³ (normal conditions) oxygen/t pig iron are introduced into the meltdown gasifier 4, i.e., 510 m³ (normal conditions) in the lower region of the coke bed 12 via supply 8 and 150 m³ (normal conditions) above the coke bed 12 via supply 9.

From the shaft furnace 1 1,150 kg sponge iron and fluxes are extracted per ton of pig iron and are charged into the meltdown gasifier via duct 21. Within the meltdown-gasifying zone 700 kg coke/t pig iron form from the coal. The pig iron incurs at a temperature of 1,450° C. and has the following chemical composition:

TABLE IV

| |
|---|
| 3.85% C |
| 0.58% Si |
| 0.45% Mn |
| 0.070% P |
| 0.050% S |

250 kg slag per ton of pig iron form from the ashes introduced with the coal, the gangue of the ore and the fluxes charged.

The crude gas forming in the meltdown gasifier 4 is drawn off at 1,000° C. and, upon scrubbing and cooling, is injected into the direct reduction zone 20 at 850° C. It incurs in an amount of 2,267 m³ (normal conditions)/t pig iron. Its chemical composition is indicated in the following Table.

TABLE V

| |
|---|
| 70.8% CO |
| 1.9% CO$_2$ |
| 18.2% H$_2$ |
| 9.1% N$_2$ + (H$_2$S about 1,300 ppm) |

The top gas forming in the shaft furnace has a temperature of 360° C., incurring in an amount of 2,092 m³ (normal conditions)/t pig iron. Its chemical composition is as follows:

TABLE VI

| |
|---|
| 51.7% CO |
| 27.0% CO$_2$ |
| 11.5% H$_2$ |
| 9.8% N$_2$ + (H$_2$S about 80 ppm) |

Its calorific value is 7,775 kJ/m³ (normal conditions).

Both with the mode of operation according to Example 1 and with that of Example 2, the top gas incurs practically free of nitrogen oxide due to the reducing conditions under which it is generated, and comprises only slight amounts of sulfur so that it may be used as a very clean combustion gas.

In order to minimize the formation of nitrogen oxides at the combustion of the top gas, a portion of the combustion air is replaced with oxygen-poor or oxygen-free gas as incurs after the air separation plant 38 and which is supplied by the supply 44.

By injecting nitrogen into the meltdown-gasifying zone 13—according to the invention, a mixture of oxygen and 5 to 25% nitrogen (or any variable nitrogen contents) being introduced—the overall calorific content of the coal charged is distributed over the larger gas amount formed, whereby the gas temperature is lowered at the level of the highest thermal release. Heat that leads, for instance, to elevated undesired temperatures when using coal having a high $C_{fix}$ portion according to Example 2, can be transported into higher zones by the nitrogen-diluted gas, thus leading to a decrease in the temperature level of the meltdown-gasifying zone 13 as is illustrated in full lines in the temperature course represented in the drawing over the height of the meltdown-gasifying zone 13 (as in contrast to the brokenline temperature course adjusting when operating in accordance with Example 1). By lowering the temperature level, no undesired binding of energy, e.g., by the increased reduction of silicon, takes place. Elevated silicon contents in the pig iron would enable a higher scrap rate in the converter steelworks, yet this would involve larger slag amounts and, thus, iron and heat losses. By injecting nitrogen, one has, therefore, succeeded in keeping the silicon content of the pig iron constant. Furthermore, also the top gas drawn off the direct reduction zone 20 is diluted and lowered in terms of its calorific value.

As indicated in Example 2, an increase in the temperature level in the upper part of the meltdown-gasifying zone 13, in order to attain a reduction gas exit temperature corresponding to Example 1 in the case of nitrogen introduction through supply 8, advantageously may be achieved in that the amount of oxygen required in the meltdown-gasifying zone 13 is divided into two partial amounts in a manner that oxygen or oxygen-containing gas is supplied to the meltdown-gasifying zone 13 via two supplies 8, 9 designed as tuyeres, one of which (supply 8) is arranged at a lower blow-in plane 49 immediately above the slag bath level 50 and the second (supply 9) of which is arranged in the gas space of the meltdown-gasifying zone closely above the coke bed. Through the lower supply 8, the nitrogen is injected in addition to oxygen. The oxygen fed through the lower supply 8 serves the gasification of coal, the oxygen fed through the upper supply 9 serves the temperature elevation in the upper part of the meltdown-gasifying zone 13. A temperature increase may be necessary in order to crack high hydrocarbon compounds deriving from the volatile constituents of the coal used and likely to cause difficulties in process engineering.

On account of the distribution of the available oxygen in the meltdown-gasifying zone among the lower and the upper supplies 8 and 9 and the variation of the amount of nitrogen fed through the lower supply 8, the temperature profile in the meltdown-gasifying zone 13 may be adjusted according to demands.

The reduction gas leaving the meltdown-gasifying zone 13 at a temperature of about 1,000° C. is scrubbed in a known manner and cooled to reduction temperature. It is conducted in total through the direct reduction zone 20, both according to Example 1 and according to Example 2. Since the sponge iron produced has a degree of metallization of up to 95% under normal reduction conditions, no change of quality of the sponge iron occurs even with more gas available. What happens is the increase in quality of the top gas extracted from he direct reduction zone, because it is less consumed by reduction work.

By a larger and hotter amount of gas being introduced into the direct reduction zone 20 according to the invention, it has become possible to reduce even low-grade ores and to widen the selection of sulfur-binding fluxes to be used. In addition to limestone, crude dolomite, crude magnesite and even siderite ores may, for instance, be used.

The top gas fed to the power generation plant is poor in sulfur and nitrogen oxides and is diluted with nitrogen. By the oxygen-poor combustion air produced by the admixture of nitrogen, it may be burnt at low flame temperatures, thus expensive secondary measures to eliminate nitrogen oxides may be dropped.

If liquid or gaseous hydrocarbons are introduced into the meltdown-gasifying zone 13 in addition to the solid carbon carriers in order to rapidly increase the gas available, fine-grained burnt desulphurating agents are introduced into the upper part of the meltdown-gasifying zone to bind the sulfur additionally introduced in this way.

What we claim is:

1. In a process for gaining electric energy in addition to producing molten pig iron from lumpy iron ore and solid fuels by using a direct reduction zone operating under overpressure to reduce the iron ore to sponge iron and a meltdown-gasifying zone to produce molten pig iron, said sponge iron being fed to said meltdown-gasifying zone as produced, introducing a charge of carbon carriers including volatile constituents and a $C_{fix}$ portion into said meltdown-gasifying zone and supplying oxygen-containing gases thereto to form reduction gas, injecting said reduction gas into said direct reduction zone to obtain reacted reduction gas, withdrawing said reacted reduction gas as a top gas, and feeding said reacted reduction gas as said top gas to a power generation plant including at least one turbine, the improvement comprising with a higher top gas consumption of said power generation plant, increasing said volatile constituents of said charge and decreasing said $C_{fix}$ portion; and with a lower top gas consumption, decreasing said volatile constituents and increasing said $C_{fix}$ portion while keeping the amount and composition of said pig iron produced substantially constant.

2. A process as set forth in claim 1, wherein said charge of carbon carriers of varying composition is comprised of three different charge sources: a first charge of coal having a high $C_{fix}$ portion, a second charge of coal having a low $C_{fix}$ portion and a third charge of liquid or gaseous hydrocarbons.

3. Process as set forth in claim 1 wherein said power generation plant comprises a first power generation stage including a gas turbine unit and a first combustion chamber, a second power generation stage including at least one steam turbine, and a heat exchanger including a second combustion chamber, and wherein said improvement further comprises:

with a lower gas consumption of said power generation plant, feeding said top gas from said direct reduction zone into said first combustion chamber, releasing said gas from said gas turbine, feeding the released gas into said heat exchanger and feeding water into said heat exchanger to produce steam, and working up said produced steam in said second power generation stage;

and with a higher gas consumption of said power generation plant, dividing said top gas into a first portion and a second portion; supplying said first portion to said first combustion chamber of said first powder generation stage and supplying said second portion to said second combustion chamber of said heat exchanger of said second power generation stage to heat said heat exchanger.

4. A process as set forth in claim 3, wherein said improvement further comprises burning said top gas in said first combustion chamber at a temperature of below 1,000° C. by adding one of nitrogen and an oxygen-poor nitrogen-oxygen mixture into said first combustion chamber.

5. A process as set forth in claim 3, wherein said improvement further comprises burning said top gas in said first combustion chamber at a temperature of below 1,000° C. by adding one of nitrogen and an oxygen-poor nitrogen-oxygen mixture into the combustion air supplied to said gas turbine.

6. A process as set forth in claim 1, wherein said improvement further comprises adding sulfur-binding fluxes to said direct reduction zone.

7. A process as set forth in claim 6, wherein said fluxes are selected from the group consisting of $CaCO_3$, $MgCO_3$ and $FeCO_3$.

8. A process as set forth in claim 1, wherein said improvement further comprises providing a lower blow-in plane in said meltdown-gasifying zone to blow in one of nitrogen and an oxygen-poor nitrogen-oxygen mixture with a low gas consumption of said power generation plant and while using a charge of coal having a high $C_{fix}$ content.

9. In an arrangement or obtaining electric energy in addition to producing molten pig iron, from lumpy iron ore and solid fuels, which arrangement comprises a direct reduction shaft furnace including a first supply means for lumpy iron ore, a second supply means for reduction gas, a first discharge means for the reduction product formed in said direct reduction shaft furnace and a second discharge means for top gas, a meltdown gasifier, into which said first discharge means enters to feed the reduction product from said shaft furnace into said meltdown gasifier, and which meltdown gasifier includes third supply means for oxygen-containing gases and for carbon carriers, said second supply means for formed reduction gas entering into said shaft furnace, and tap means for tapping pig iron and slag, and a combined gas and steam turbine power generation plant including a gas turbine unit with a first combustion chamber to receive said top gas and a steam turbine unit with a heat exchanger to receive offgas from said gas turbine unit, the improvement comprising providing at least one coal reservoir for supplying coal having a high $C_{fix}$ portion and at least one coal reservoir for supplying col having a low $C_{fix}$ portion; and a branch duct branching off said second discharge means for conducting top gas from said direct reduction shaft furnace into said combustion chamber of said gas turbine unit and including a control valve, and a second Combustion chamber provided in said heat exchanger of said steam turbine unit to receive said branch duct.

10. An arrangement as set forth in claim 9, wherein said third supply means comprises a feed for feeding one of nitrogen and an oxygen-poor nitrogen-oxygen mixture entering into said meltdown gasifier near the lower end of its meltdown-gasifying zone.

11. An arrangement as set forth in claim 9, further comprising a fourth supply means for supplying unburnt fluxes into said shaft furnace.

12. An arrangement as set forth in claim 9, wherein said third supply means comprises a feed for carbon carriers liquid or gaseous at room temperature.

* * * * *